(12) United States Patent
Tsuchizawa et al.

(10) Patent No.: US 11,383,790 B2
(45) Date of Patent: Jul. 12, 2022

(54) HUMAN-POWERED VEHICLE CONTROL DEVICE

(71) Applicant: Shimano Inc., Osaka (JP)

(72) Inventors: Yasuhiro Tsuchizawa, Osaka (JP); Hiroshi Matsuda, Osaka (JP)

(73) Assignee: Shimano Inc., Osaka (JP)

( * ) Notice: Subject to any disclaimer, the term of this patent is extended or adjusted under 35 U.S.C. 154(b) by 176 days.

(21) Appl. No.: 16/353,323

(22) Filed: Mar. 14, 2019

(65) Prior Publication Data

US 2019/0291812 A1    Sep. 26, 2019

(30) Foreign Application Priority Data

Mar. 22, 2018    (JP) .............................. JP2018-054910

(51) Int. Cl.
*B62M 6/50* (2010.01)
*B62M 6/55* (2010.01)

(52) U.S. Cl.
CPC ................ *B62M 6/50* (2013.01); *B62M 6/55* (2013.01)

(58) Field of Classification Search
None
See application file for complete search history.

(56) References Cited

U.S. PATENT DOCUMENTS

| | | | | |
|---|---|---|---|---|
| 5,474,148 A | * | 12/1995 | Takata | ................... B60L 50/52 180/206.2 |
| 5,971,090 A | * | 10/1999 | Tanaka | ................... B60L 50/53 180/206.2 |
| 6,306,062 B1 | * | 10/2001 | Toukura | ............ B60W 30/1819 477/107 |
| 9,505,310 B2 | * | 11/2016 | Kronfeld | ................. B60L 50/20 |
| 9,669,700 B2 | * | 6/2017 | Biderman | .......... A63B 24/0087 |
| 2016/0121730 A1 | | 5/2016 | Fujita et al. | |
| 2017/0138807 A1 | * | 5/2017 | Miau | ........................ G01L 3/24 |

FOREIGN PATENT DOCUMENTS

| | | | | |
|---|---|---|---|---|
| CN | 105564581 A | 5/2016 | | |
| DE | 10 2017 111 876 A1 | 12/2017 | | |
| EP | 2 548 795 A1 | 1/2013 | | |
| JP | 9-39873 A | 2/1997 | | |
| JP | 10-59260 A | 3/1998 | | |
| JP | 11-29086 A | 2/1999 | | |
| JP | 2002255082 A | * | 9/2002 | ............. B62M 6/45 |
| JP | 4518298 B2 | 8/2010 | | |
| JP | 4518299 B2 | 8/2010 | | |
| JP | 4518300 B2 | 8/2010 | | |
| JP | 4518301 B2 | 8/2010 | | |
| JP | 4608764 B2 | 1/2011 | | |
| JP | 2011-189914 A | 9/2011 | | |
| JP | 2016-101761 A | 6/2016 | | |

* cited by examiner

*Primary Examiner* — James J Lee
*Assistant Examiner* — Wenyuan Yang
(74) *Attorney, Agent, or Firm* — Global IP Counselors, LLP

(57) ABSTRACT

A human-powered vehicle control device includes an electronic controller configured to control a motor that assists in propulsion of a human-powered vehicle in accordance with a human driving force input to the human-powered vehicle. The electronic controller is configured to change a ratio of a power of the motor to a power of the human driving force and control the motor so that a change amount of the travel resistance differs from a change amount of the power of the motor upon determining a travel resistance of the human-powered vehicle has changed.

22 Claims, 3 Drawing Sheets

HUMAN-POWERED VEHICLE CONTROL DEVICE

CROSS-REFERENCE TO RELATED APPLICATIONS

This application claims priority to Japanese Patent Application No. 2018-054910, filed on Mar. 22, 2018. The entire disclosure of Japanese Patent Application No. 2018-054910 is hereby incorporated herein by reference.

BACKGROUND

Technical Field

The present invention generally relates to a human-powered vehicle control device.

Background Information

Japanese Laid-Open Patent Publication No. 10-59260 (Patent document 1) describes an example of a human-powered vehicle control device configured to control a motor so that a ratio of the output of the motor to a human driving force input to the human-powered vehicle becomes a predetermined ratio.

SUMMARY

One object of the present disclosure is to provide a human-powered vehicle control device that suitably controls a motor.

A human-powered vehicle control device in accordance with a first aspect of the present disclosure comprises an electronic controller configured to control a motor that assists in propulsion of a human-powered vehicle in accordance with a human driving force input to the human-powered vehicle. The electronic controller is configured to change a ratio of a power of the motor to a power of the human driving force and control the motor so that a change amount of the travel resistance differs from a change amount of the power of the motor upon determining a travel resistance has changed.

In accordance with the human-powered vehicle control device of the first aspect, the ratio of the power of the motor to the power of the human driving force can be changed to a ratio suitable for the traveling environment, the traveling state, and the like of the human-powered vehicle. In a case where the travel resistance of the human-powered vehicle changes, the motor is controlled so that the change amount in the travel resistance differs from the change amount in the power of the motor. This allows the rider to feel the change in the travel resistance.

In accordance with a second aspect of the present disclosure, in the human-powered vehicle control device according to the first aspect the electronic controller is configured to control the motor so that the ratio decreases as the travel resistance increases upon determining the travel resistance is in a predetermined range.

In accordance with the human-powered vehicle control device of the second aspect, in a case where the travel resistance is in a predetermined range, the ratio decreases as the travel resistance increases. Thus, the rider can ride the human-powered vehicle with a feel similar to that of a general human-powered vehicle that does not include a motor for assisting propulsion of the human-powered vehicle.

In accordance with a third aspect of the present disclosure, in the human-powered vehicle control device according to the second aspect the electronic controller is configured to control the motor so that the ratio decreases in proportion to the travel resistance upon determining the travel resistance is in a predetermined range.

In accordance with the human-powered vehicle control device of the third aspect, the rider can ride the human-powered vehicle with a feel similar to that of a general human-powered vehicle that does not include a motor for assisting propulsion of the human-powered vehicle.

In accordance with a fourth aspect of the present disclosure, the human-powered vehicle control device according to any one of the first to third aspects further comprises a storage having a relationship between the travel resistance and the ratio stored therein.

In accordance with the fourth aspect, the electronic controller can smoothly control the motor by using the relationship between the travel resistance and the ratio stored in the storage.

In accordance with a fifth aspect of the present disclosure, the human-powered vehicle control device according to the fourth aspect is configured so that the storage stores the relationship between the travel resistance and the ratio in a changeable manner.

In accordance with the human-powered vehicle control device of the fifth aspect, the relationship between the travel resistance and the ratio stored in the storage can be changed to a relationship suitable for the rider.

In accordance with a sixth aspect of the present disclosure, the human-powered vehicle control device according to the fifth aspect is configured so that the electronic controller is configured to change the relationship between the travel resistance and the ratio stored in the storage in accordance with an operation of an operation unit.

In accordance with the human-powered vehicle control device of the sixth aspect, the relationship between the travel resistance and the ratio stored in the storage can be easily changed by the operation of the operation unit.

In accordance with a seventh aspect of the present disclosure, in the human-powered vehicle control device according to any one of the first to sixth aspects, the electronic controller is configured to control the motor so that an output of the motor is less than or equal to a predetermined value.

In accordance with the human-powered vehicle control device of the seventh aspect, the motor is controlled so that the output of the motor does not exceed a predetermined value. This avoids the application of excessive load to the motor.

In accordance with an eighth aspect of the present disclosure, in the human-powered vehicle control device according to any one of the first to seventh aspects, the electronic controller is configured to control the motor so that a torque ratio of an output torque of the motor to a torque of the human driving force is less than or equal to a predetermined torque ratio.

In accordance with the human-powered vehicle control device of the eighth aspect, the motor is controlled so that the torque ratio does not exceed the predetermined torque ratio. This reduces situations in which the output torque of the motor becomes too large.

In accordance with a ninth aspect of the present disclosure, in the human-powered vehicle control device according to any one of the first to eighth aspects, the electronic controller is configured to control the motor in a plurality of control modes having different ratios of an output of the motor to the human driving force, and the relationship between the travel resistance and the ratio is different for each of the plurality of control modes.

In accordance with the ninth aspect, the relationship between the travel resistance and the ratio can be changed by changing the control mode.

In accordance with a tenth aspect of the present disclosure, the human-powered vehicle control device according to any one of the first to ninth aspects is configured so that the travel resistance includes at least one of an air resistance, a rolling resistance of a wheel of the human-powered vehicle, and a gradient resistance of a traveling road of the human-powered vehicle.

In accordance with the human-powered vehicle control device of the tenth aspect, the motor can be controlled taking into consideration the influence of at least one of the air resistance, the rolling resistance of the wheel of the human-powered vehicle, and the gradient resistance of the traveling road of the human-powered vehicle.

In accordance with a eleventh aspect of the present disclosure, the human-powered vehicle control device according to any one of the first to tenth aspects further comprises a first detector for detecting the travel resistance.

In accordance with the human-powered vehicle control device of the eleventh aspect, the travel resistance is suitably detected by the first detector.

In accordance with a twelfth aspect of the present disclosure, the human-powered vehicle control device according to the eleventh aspect is configured so that the first detector includes at least one of a sensor for detecting a wind speed, a sensor for detecting a tilt of the human-powered vehicle, a sensor for detecting a vehicle speed of the human-powered vehicle, a sensor for detecting a torque of the human driving force, and a sensor for detecting a rotational speed of a crank of the human-powered vehicle.

In accordance with the human-powered vehicle control device of the twelfth aspect, the travel resistance can be suitably detected by at least one of the sensor for detecting the wind speed, the sensor for detecting the tilt of the human-powered vehicle, the sensor for detecting the vehicle speed of the human-powered vehicle, the sensor for detecting the torque of the human driving force, and the sensor for detecting the rotational speed of the crank of the human-powered vehicle.

In accordance with a thirteenth aspect of the present disclosure, the human-powered vehicle control device according to the twelfth aspect is configured so that the travel resistance is calculated based on the torque of the human driving force, the rotational speed of the crank, and the vehicle speed.

In accordance with the human-powered vehicle control device of the thirteenth aspect, the travel resistance can be suitably detected based on the torque of the human driving force, the rotational speed of the crank, and the vehicle speed.

In accordance with a fourteenth aspect of the present disclosure, the human-powered vehicle control device according to any one of the first to thirteenth aspects further comprises a second detector for detecting the human driving force.

In accordance with the human-powered vehicle control device of the fourteenth aspect, the human driving force can be suitably detected by the second detector.

The human-powered vehicle control device in accordance with the present disclosure can suitably control the motor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle control device 50 in accordance with one embodiment will now be described with reference to FIGS. 1 to 4. Hereinafter, the human-powered vehicle control device 50 will simply be referred to as the control device 50. The control device 50 is provided on a human-powered vehicle 10. The human-powered vehicle 10 is a vehicle that can be driven by at least a human driving force. The human-powered vehicle 10 includes, for example, a bicycle. The human-powered vehicle 10 also includes, for example, a unicycle and a vehicle having three or more wheels, and the number of wheels is not limited. The human-powered vehicle 10 includes, for example, a mountain bike, a road bike, a city bike, a carried load bike, and a recumbent bike. Hereinafter, the human-powered vehicle 10 will be described as a bicycle in the embodiment.

Figure 1:
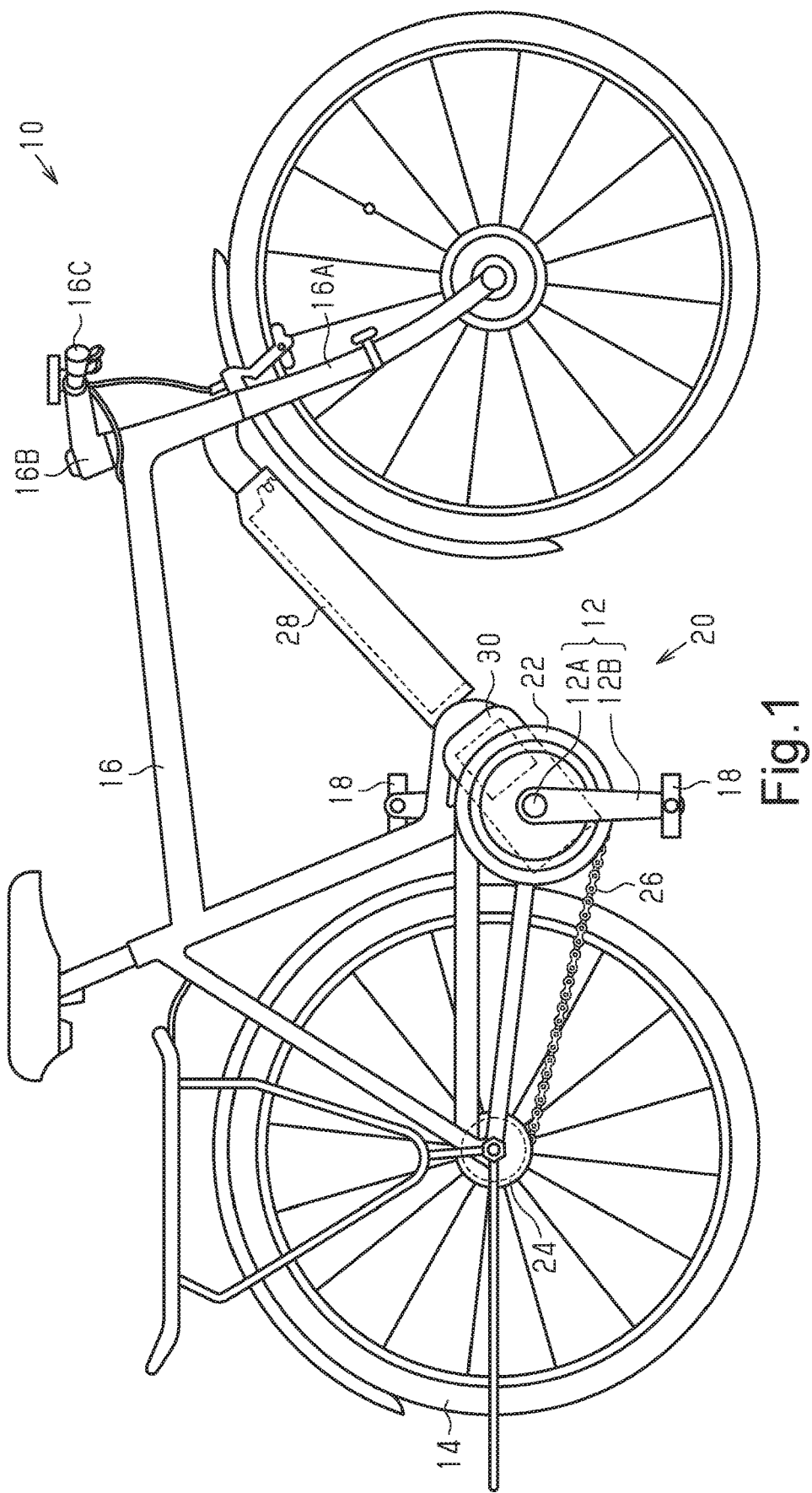
FIG. 1 is a side elevational view of a human-powered vehicle including a human-powered vehicle control device according to one embodiment.

As shown in FIG. 1, the human-powered vehicle 10 includes a crank 12 and a driving wheel 14. The human-powered vehicle 10 further includes a frame 16. A human driving force H is input to the crank 12. The crank 12 includes a crankshaft 12A rotatable relative to the frame 16 and a pair of crank arms 12B provided on the two axial ends of the crankshaft 12A. A pedal 18 is connected to each of the crank arms 12B. The driving wheel 14 is driven by the rotation of the crank 12. The driving wheel 14 is supported by the frame 16. The crank 12 and the driving wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured to rotate the first rotary body 22 forward in a case where the crank 12 rotates forward and not to rotate the first rotary body 22 backward in a case where the crank 12 rotates backward. The first rotary body 22 includes a sprocket, a pulley, or a bevel gear. The drive mechanism 20 further includes a linking member 26 and a second rotary body 24. The linking member 26 transmits the rotational force of the first rotary body 22 to the second rotary body 24. The linking member 26 includes, for example, a chain, a belt, or a shaft.

The second rotary body 24 is connected to the driving wheel 14. The second rotary body 24 includes a sprocket, a pulley, or a bevel gear. A second one-way clutch is preferably provided between the second rotary body 24 and the driving wheel 14. The second one-way clutch is configured so as to rotate the driving wheel 14 forward in a case where the second rotary body 24 rotates forward and not to rotate the driving wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the following description, the rear wheel will be referred to as the driving wheel 14 although the front wheel can serve as the driving wheel 14.

Figure 2:
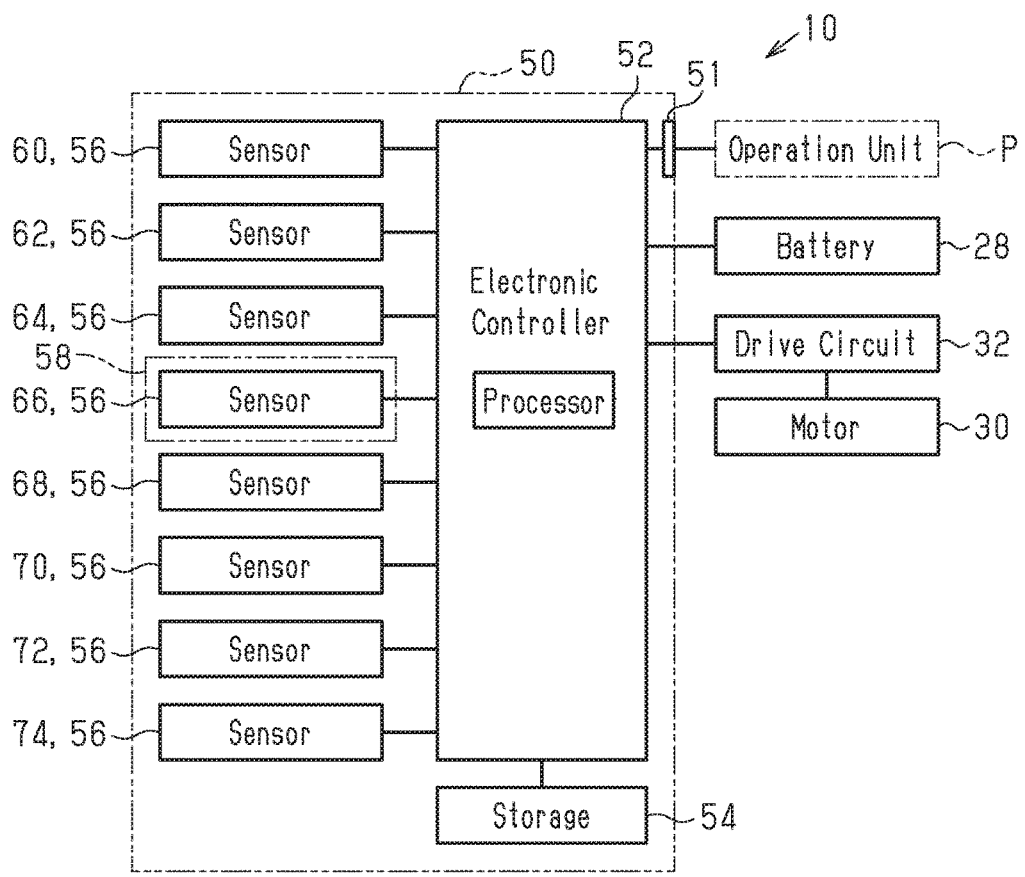
FIG. 2 is a block diagram showing the electrical configuration of the human-powered vehicle including the human-powered vehicle control device according to the embodiment.

As shown in FIGS. 1 and 2, the human-powered vehicle 10 further includes a battery 28, a motor 30, and a drive circuit 32.

The battery 28 includes one or more battery cells. The battery cell includes a rechargeable battery. The battery 28 is provided in the human-powered vehicle 10 and supplies power to other electric parts electrically connected to the battery 28 by wires, such as the motor 30 and the control device 50. The battery 28 is configured to communicate with an electronic controller 52 through wired connection or wireless connection. The electronic controller 52 will simply be referred to as the controller 52. The battery 28 is configured to communicate with the controller 52 through, for example, power line communication (PLC). The battery 28 can be attached to the outside of the frame 16 or partially accommodated in the frame 16.

The motor 30 and the drive circuit 32 are preferably provided on the same housing. The drive circuit 32 controls the power supplied from the battery 28 to the motor 30. The drive circuit 32 is configured to communicate with the controller 52 of the control device 50 through wired connection or wireless connection. The drive circuit 32 is configured to communicate with the controller 52, for example, through serial communication. The drive circuit 32 drives the motor 30 in accordance with a control signal from the controller 52. The motor 30 assists the propulsion of the human-powered vehicle 10. The motor 30 includes an electric motor. The motor 30 is provided in a power transmission path of the human driving force H extending from the pedals 18 to the rear wheel or provided to transmit the rotation to the front wheel. The motor 30 is provided on the frame 16, the rear wheel, or the front wheel of the human-powered vehicle 10. In the present embodiment, the motor 30 is coupled to a power transmission path extending from the crankshaft 12A to the first rotary body 22. A one-way clutch is preferably provided in the power transmission path between the motor 30 and the crankshaft 12A so that the motor 30 is not rotated by the rotational force of the crank 12 in a case where the crankshaft 12A is rotated in the direction moving the human-powered vehicle 10 forward. The housing on which the motor 30 and the drive circuit 32 are provided can be provided with components other than the motor 30 and the drive circuit 32. For example, a speed reducer that decelerates and outputs the rotation of the motor 30 can be provided on the housing. The drive circuit 32 includes an inverter circuit.

As shown in FIG. 2, the control device 50 includes the controller 52. In the present embodiment, the control device 50 further includes a storage 54. In the present embodiment, the control device 50 further includes a first detector 56. In the present embodiment, the control device 50 further includes a second detector 58.

The controller 52 includes at least one processor that executes a control program set in advance. The processor is, for example, a central processing unit (CPU) or a micro-processing unit (MPU). The controller 52 can include one or more microcomputers. The controller 52 can include a plurality of processors that are located at separate positions.

The terms "controller" and "electronic controller" as used herein refer to hardware that executes a software program and does not include a human. The storage 54 stores various control programs and information used for various control processes. The storage 54 includes any computer storage device or any non-transitory computer-readable medium with the sole exception of a transitory, propagating signal. For example, the storage 54 includes a nonvolatile memory and a volatile memory. The controller 52 and the storage 54 are, for example, provided on the housing on which the motor 30 is provided. The controller 52 can include the drive circuit 32.

The first detector 56 is configured to detect a travel resistance R. The first detector 56 is configured to communicate with the controller 52 of the control device 50 through wired connection or wireless connection. The first detector 56 includes at least one of a wind sensor 60, an inclination sensor 62, a vehicle speed sensor 64, a torque sensor 66, and a crank rotation sensor 68. The first detector 56 can further include at least one of an image sensor 70, a load sensor 72, and an acceleration sensor 74.

The wind sensor 60 is configured to detect the wind speed. The wind sensor 60 includes at least one of a wind speed sensor and a wind pressure sensor. The wind sensor 60 can any wind sensor that can produce a signal that is indicative at least one of a wind speed and a wind pressure. The wind sensor 60 is provided, for example, on the handlebar 16C of the human-powered vehicle 10. The wind sensor 60 is preferably for detecting at least one of the headwind and the tailwind in a case where the human-powered vehicle 10 travels forward.

The inclination sensor 62 is configured to detect the tilt of the human-powered vehicle 10. An inclination angle D of the road surface on which the human-powered vehicle 10 travels can be detected by the inclination sensor 62. The inclination angle D of the road surface on which the human-powered vehicle 10 travels can be detected from the inclination angle with respect to an advancing direction of the human-powered vehicle 10. The inclination angle D of the road surface on which the human-powered vehicle 10 travels corresponds to the inclination angle of the human-powered vehicle 10. In one example, the inclination sensor 62 can be any suitable inclination sensor that can produce a signal that is indicative an inclination of the human-powered vehicle 10. An example of the inclination sensor 62 is a gyro sensor or an acceleration sensor. In another example, the inclination sensor 62 includes a global positioning system (GPS) receiver. The controller 52 can calculate the inclination angle D of the road surface on which the human-powered vehicle 10 travels in accordance with the GPS information acquired by the GPS receiver and the road surface gradient included in the map information recorded in advance to the storage 54.

The vehicle speed sensor 64 is configured to detect the vehicle speed V of the human-powered vehicle 10. In one example, the sensor 64 can be any suitable vehicle speed sensor that can produce a signal that is indicative of the rotational speed of a wheel. The vehicle speed sensor 64 detects the rotational speed of the wheel. The vehicle speed sensor 64 is electrically connected to the controller 52 in a wired or wireless manner. The vehicle speed sensor 64 is configured to communicate with the controller 52 through wired connection or wireless connection. The vehicle speed sensor 64 outputs a signal corresponding to the rotational speed of the wheel to the controller 52. The controller 52 calculates a vehicle speed V of the human-powered vehicle 10 based on the rotational speed of the wheel. The controller 52 stops the motor 30 in a case where the vehicle speed V becomes higher than or equal to a predetermined value. The predetermined value is, for example, 25 kilometers per hour or 45 kilometers per hour. The vehicle speed sensor 64 preferably includes a magnetic reed forming a reed switch or a Hall element. The vehicle speed sensor 64 can be mounted on a chain stay of the frame 16 to detect a magnet attached to the rear wheel or can be provided on the front fork 16A to detect a magnet attached to the front wheel. Thus, in the case of a reed switch or a Hall element, the vehicle speed sensor 64 indirectly detects the rotational speed of the wheel by detecting a magnet attached to the wheel. In another example, the vehicle speed sensor 64 includes a GPS receiver. The controller 52 can detect the vehicle speed V of the human-powered vehicle 10 in accordance with the GPS information acquired by the GPS receiver, the map information recorded in advance in the storage 54, and the time. The controller 52 preferably includes a time measurement circuit for measuring time. Alternatively, the vehicle speed sensor 64 can directly detect the rotational speed of the wheel by using a speedometer gear assembly that is directly rotated by the wheel.

The torque sensor 66 is for detecting a torque TH of the human driving force H. The sensor 66 can be any suitable torque sensor that can produce a signal that is indicative of a torque of the human driving force H. The torque sensor 66 is provided, for example, on the housing in which the motor 30 is provided. The torque sensor detects the torque TH of the human driving force H input to the crank 12. For example, in a case where the first one-way clutch is provided in the power transmission path, the torque sensor 66 is provided on the upstream side of the first one-way clutch. The torque sensor 66 includes a strain sensor, a magnetostrictive sensor, or the like. The strain sensor 66 includes a strain gauge. In a case where the torque sensor 66 includes a strain sensor, the strain sensor is preferably provided on the outer circumferential portion of the rotary body included in the power transmission path. The torque sensor 66 can include a wireless or wired communicator. The communicator of the torque sensor 66 is configured to communicate with the controller 52.

The crank rotation sensor 68 is for detecting the rotational speed N of the crank 12 of the human-powered vehicle 10. The crank rotation sensor 68 can be any suitable crank rotation sensor that can produce a signal that is indicative of a rotational speed N of the crank 12 of the human-powered vehicle 10. The crank rotation sensor 68 is attached to, for example, the frame 16 of the human-powered vehicle 10 or the housing on which the motor 30 is provided. The crank rotation sensor 68 is configured to include a magnetic sensor that outputs a signal corresponding to the intensity of the magnetic field. An annular magnet, of which the magnetic field has an intensity that changes in the circumferential direction, is provided on the crankshaft 12A or the power transmission path between the crankshaft 12A and the first rotary body 22. The crank rotation sensor 68 is configured to communicate with the controller 52 through wired connection or wireless connection. The crank rotation sensor 68 outputs a signal corresponding to the rotational speed N of the crank 12 to the controller 52. The crank rotation sensor 68 can be provided on a member that rotates integrally with the crankshaft 12A in the power transmission path of the human driving force H extending from the crankshaft 12A to the first rotary body 22. For example, the crank rotation sensor 68 can be provided on the first rotary body 22 in a case where the first one-way clutch is not provided between the crankshaft 12A and the first rotary body 22. The crank rotation sensor 68 is configured to detect a vehicle speed V of the human-powered vehicle 10. In this case, the controller 52 calculates the rotational speed of the driving wheel 14 in accordance with the rotational speed N of the crank 12 detected by the sensor 68 and the transmission ratio B of the human-powered vehicle 10 to obtain the vehicle speed V of the human-powered vehicle 10. A transmission ratio B is a ratio of the rotational speed N of the crank 12 to the rotational speed of the driving wheel 14 of the human-powered vehicle 10. Information on the transmission ratio B of the human-powered vehicle 10 is stored in advance in the storage 54.

In a case where the human-powered vehicle 10 includes a transmission for changing the transmission ratio B, the controller 52 can be configured to calculate the transmission ratio B in accordance with the vehicle speed V of the human-powered vehicle 10 and the rotational speed N of the crank 12. In this case, information on the circumferential length of the driving wheel 14, the diameter of the driving wheel 14, or the radius of the driving wheel 14 is stored in advance in the storage 54. The transmission includes at least one of a derailleur and an internal transmission device. The derailleur includes at least one of a front derailleur and a rear derailleur. In a case where the crank rotation sensor 68 detects the rotational speed of the driving wheel 14 and the human-powered vehicle 10 includes the transmission, the crank rotation sensor 68 preferably includes a shift sensor for detecting the transmission ratio B. The shift sensor detects the present shift stage of the transmission. The relationship between the shift stage and the transmission ratio B is stored in advance in the storage 54. Thus, the controller 52 can detect the present transmission ratio B from the detection result of the shift sensor. The controller 52 can calculate the rotational speed N of the crank 12 by dividing the rotational speed of the driving wheel 14 by the transmission ratio B. In this case, the crank rotation sensor 68 can be used as the sensor 64.

The image sensor 70 is configured to detect a front projection area A of at least one of the human-powered vehicle 10 and the rider. The image sensor 70 can be any suitable image sensor that can produce a signal that is indicative of a front projection area A of at least one of the human-powered vehicle 10 and the rider. For example, the image sensor 70 is provided on the handlebar 16C of the human-powered vehicle 10 to capture an image of a rider of the human-powered vehicle 10. The image sensor 70 outputs image data of at least one of the human-powered vehicle 10 and the rider to the controller 52. The controller 52 calculates the front projection area A of at least one of the human-powered vehicle 10 and the rider in accordance with the image data input from the image sensor 70.

The load sensor 72 is for detecting a value related to the weight of the carried load of the human-powered vehicle 10. The load sensor 72 detects the weight of the carried load of the human-powered vehicle 10. The load sensor 72 can be any suitable load sensor that can produce a signal that is indicative of the weight of the carried load of the human-powered vehicle 10. The load sensor 72 is provided, for example, on an axle of at least one of the front wheel and the rear wheel. In this case, the load sensor 72 is preferably provided on both the front wheel and the rear wheel. The total weight m of the human-powered vehicle 10 and the carried load can be detected by, for example, associating a signal output from the load sensor 72 in a state where the human-powered vehicle 10 is lifted from the ground to weight 0 (gram weight). Furthermore, the weight of the rider of the human-powered vehicle 10 can be detected by, for example, associating a signal output from the load sensor 72 in a state where the rider is not riding the human-powered vehicle 10 to weight 0 (gram weight). The relationship between the information output from the load sensor 72 and the weight is preferably stored in the storage 54. The load sensor 72 includes a pressure sensor or a strain sensor. The load sensor 72 can be for detecting, for example, the force applied to the saddle of the human-powered vehicle 10. In this case, the weight of the rider can be detected by the load sensor 72. For example, the load sensor 72 can detect the air pressure of the tire of the human-powered vehicle 10. In this case, the controller 52 calculates the weight of the carried load using the air pressure of the tire. Instead of the load sensor 72, an input unit configured to input information on the weight of the carried load to the controller 52 can be provided on the control device 50. In a case where the information on the weight of the rider is input with the input unit, the controller 52 preferably stores the information on the weight of the rider in the storage 54. The information on the weight of the carried load includes, for example, the weight of the rider. The information on the weight of the human-powered vehicle 10 is stored in the storage 54. The controller 52 can calculate the total weight m of the human-powered vehicle 10 and the carried load thereon by adding the weight of the human-powered vehicle 10 and the weight of the carried load.

The acceleration sensor 74 is for detecting an acceleration a in the direction in which the human-powered vehicle 10 moves forward. The acceleration sensor 74 can be any suitable acceleration sensor that can produce a signal that is indicative of a forward acceleration of the human-powered vehicle 10. The acceleration sensor 74 outputs a signal corresponding to the acceleration a in the direction in which the human-powered vehicle 10 moves forward to the controller 52.

The second detector 58 is configured to detect the human driving force H. The second detector 58 has a configuration similar to the torque sensor 66. The torque sensor 66 can be used as the second detector 58, and the second detector 58 can be separate from the torque sensor 66. In a case where the power WH of the human driving force H is detected using the second detector 58, the second detector 58 has a configuration similar to the torque sensor 66 and the crank rotation sensor 68. The torque sensor 66 and the crank rotation sensor 68 can be used as the second detector 58, and the second detector 58 can be separate from the torque sensor 66 and the crank rotation sensor 68.

The travel resistance R includes at least one of an air resistance R1, a rolling resistance R2 of the wheel of the human-powered vehicle 10, and a gradient resistance R3 of the traveling road of the human-powered vehicle 10. In one example, the travel resistance R includes every one of the air resistance R1, the rolling resistance R2 of the wheel of the human-powered vehicle 10, and the gradient resistance R3 of the traveling road of the human-powered vehicle 10.

The controller 52 calculates the travel resistance R based on the output of the first detector 56 and the information stored in the storage 54.

The travel resistance R includes the air resistance R1, the rolling resistance R2 of the wheel of the human-powered vehicle 10, the gradient resistance R3 of the traveling road of the human-powered vehicle 10, and an acceleration resistance R4 of the human-powered vehicle 10. The output of the human-powered vehicle 10 corresponds to the travel resistance R. Therefore, in one example, the travel resistance R is calculated based on the torque TH of the human driving force H, the rotational speed N of the crank 12, and the vehicle speed V. In this case, the travel resistance R is obtained, for example, from equation (1).

$$R = (2P/60) \times (T \times N \times eH) \pm V \qquad (1)$$

Symbol "P" indicates the circumference ratio. Symbol "T" indicates the output torque of the human-powered vehicle 10. The output torque T of the human-powered vehicle 10 is the output torque of a drive unit. In the present embodiment, the output torque T is the torque around the portion of the crankshaft 12A to which the first rotary body 22 is attached. The drive unit is provided in the vicinity of the crankshaft 12A, and the output of the motor 30 merges with the human driving force H in the power transmission path of the human driving force H at the upstream side of the first rotary body 22. The output torque T of the human-powered vehicle 10 is obtained by adding the torque TH of the human driving force H that is input to the human-powered vehicle 10 and the torque TM that is generated by the motor 30 and input to the portion where the first rotary body 22 is attached. In this case, the output torque T of the human-powered vehicle 10 can be detected by the torque sensor 66 by providing the torque sensor 66 at the downstream side of the portion where the output of the motor 30 merges with the human driving force H in the power transmission path of the human driving force H. Furthermore, in equation (1), the torque TH of the human driving force H that is not added to the output of the motor 30 can be used as the output torque T of the human-powered vehicle 10.

Symbol "N" indicates the rotational speed of the crank 12 of the human-powered vehicle 10. Symbol "eH" indicates the power transmission efficiency of the human driving force H of the human-powered vehicle 10 to the driving wheel 14. The power transmission efficiency is obtained from the power loss of the power transmission path stored in advance in the storage 54 and the present transmission ratio B of the human-powered vehicle 10. In a case where the power transmission efficiency differs in accordance with the transmission ratio B of the human-powered vehicle 10, the power transmission efficiency corresponding to each transmission ratio B is preferably stored in the storage 54. Symbol "eH" can include the power transmission efficiency of the output of the motor 30 to the driving wheel 14. In a case where eH includes the power transmission efficiency of the output of the motor 30 to the driving wheel 14, the power transmission efficiency corresponding to the output of the motor 30 can be stored. Symbol "V" indicates the vehicle speed of the human-powered vehicle 10.

In a case where the motor 30 is provided on the front wheel, the controller 52 can obtain the travel resistance R by adding the travel resistance RH related to the human driving force H and the travel resistance RM related to the output of the motor 30. In this case, the travel resistance RH related to the human driving force H is obtained in the same manner as in equation (1). The travel resistance RM related to the output of the motor 30 is obtained by replacing the portion of "T×N" in equation (1) with the power WM of the motor 30 and replacing "eH" with the power transmission efficiency of the output of the motor 30 to the front wheel.

In another example, the travel resistance R is calculated based on the air resistance R1, the rolling resistance R2 of the wheel of the human-powered vehicle 10, the gradient resistance R3 of the traveling road of the human-powered vehicle 10, and the acceleration resistance R4 of the human-powered vehicle 10. In this case, the travel resistance R is obtained, for example, from equation (2). The air resistance R1 is obtained from equation (3). The rolling resistance R2 of the wheel of the human-powered vehicle 10 is obtained from equation (4). The gradient resistance R3 of the traveling road of the human-powered vehicle 10 is obtained from equation (5). The acceleration resistance R4 of the human-powered vehicle 10 is obtained from equation (6).

$$R = R1 + R2 + R3 + R4 \quad (2)$$

$$R1 = C \times A \times (V - Va)^2 \quad (3)$$

$$R2 = M \times m \times g \quad (4)$$

$$R3 = m \times g \times \sin D \quad (5)$$

$$R4 = m \times a \quad (6)$$

Symbol "C" indicates the air resistance coefficient of at least one of the human-powered vehicle 10 and the rider. The air resistance coefficient C can be stored in advance in the storage 54 as an appropriate fixed value or input by a rider through an operation unit P or the like.

Symbol "A" indicates the front projection area A. The front projection area A can be detected with the image sensor 70, stored in advance in the storage 54 as an appropriate fixed value, or input by a user through the operation unit P or the like.

Symbol "Va" indicates the wind speed detected by the wind sensor 60. The wind speed Va is a negative value in a case where the wind is a headwind with respect to the human-powered vehicle 10. In a case where the detector is arranged directed in the forward moving direction of the human-powered vehicle 10 so that the wind sensor 60 detects the headwind in the forward moving direction, the wind sensor 60 outputs a signal corresponding to V−Va. The wind speed Va can be detected by the wind sensor 60, stored in advance in the storage 54 as an appropriate fixed value, or input by a rider through the operation unit P or the like.

Symbol "M" indicates the rolling resistance coefficient of the tire of the human-powered vehicle 10. The rolling resistance coefficient M can be stored in advance in the storage 54 as an appropriate fixed value or input by the rider through the operation unit P or the like.

Symbol "m" indicates the total weight of the human-powered vehicle 10 and the carried load. The total weight m can be detected with the load sensor 72, stored in advance in the storage 54 as an appropriate fixed value, or input by a rider through the operation unit P or the like.

Symbol "g" indicates the gravitational acceleration of the human-powered vehicle 10. Symbol "D" indicates the inclination angle of the road surface on which the human-powered vehicle 10 travels. The inclination angle D can be detected by the sensor 62, stored in advance in the storage 54 as an appropriate fixed value, or input by a rider through the operation unit P or the like.

Symbol "a" indicates the acceleration of the human-powered vehicle 10. The acceleration a can be detected by the acceleration sensor 74, be stored in advance in the storage 54 as an appropriate fixed value can, or input by a rider through the operation unit P or the like.

In a further example, the travel resistance R is calculated based on the torque of the human-powered vehicle 10. In this case, the travel resistance R is obtained, for example, from equation (7).

$$R = (T \times iH \times eH) \div r \quad (7)$$

"iH" indicates a ratio of the rotational speed of the crank 12 to the rotational speed of the driving wheel 14. The ratio iH is a reciprocal of the transmission ratio B. In a case where the transmission for changing the transmission ratio B is provided in the human-powered vehicle 10, the controller 52 can calculate the ratio iH in accordance with the vehicle speed V of the human-powered vehicle 10 and the rotational speed N of the crank 12. In this case, information on the circumferential length of the driving wheel 14, the diameter of the driving wheel 14, or the radius of the driving wheel 14 is stored in advance in the storage 54. The controller 52 can calculate the rotational speed of the driving wheel 14 from the vehicle speed V using the circumferential length of the driving wheel 14, the diameter of the driving wheel 14, or the radius of the driving wheel 14. The controller 52 can calculate the ratio iH by dividing the rotational speed N of the crank 12 by the rotational speed of the driving wheel 14. In a case where the vehicle speed sensor 64 detects the rotational speed of the driving wheel 14 and the human-powered vehicle 10 includes a transmission, the vehicle speed sensor 64 preferably includes a shift sensor for detecting the transmission ratio B. The shift sensor detects the present shift stage of the transmission. The relationship between the shift stage and the transmission ratio B is stored in advance in the storage 54. This allows the controller 52 to obtain the present transmission ratio B from the detection result of the shift sensor. The controller 52 can calculate the ratio iH by obtaining a reciprocal of the transmission ratio B. Symbol "r" indicates the radius of the wheel.

In a case where the motor 30 is provided on the front wheel, the controller 52 can obtain the travel resistance R by adding the travel resistance RH related to the human driving force H and the travel resistance RM related to the output of the motor 30. In this case, the travel resistance RH related to the human driving force H can be obtained in the same manner as in equation (7). The travel resistance RM related to the output of the motor 30 is obtained by replacing the portion of "T" in equation (7) with the torque TM of the motor 30, replacing "eH" with the power transmission efficiency of the motor 30 to the front wheel, and replacing "iH" with "1" in a case where the motor 30 directly rotates the front wheel.

The controller 52 controls the motor 30 in accordance with the human driving force H input to the human-powered vehicle 10. The controller 52 controls the motor 30 in a plurality of control modes having different ratios Y of the output of the motor 30 to the human driving force H. A ratio YA of the power WM (watt) of the motor 30 to the power WH (watt) of the human driving force H of the human-powered vehicle 10 is also referred to as the ratio Y. The power WH of the human driving force H is calculated by multiplying the human driving force H and the rotational speed N of the crank 12. A torque ratio YB of the output torque TM of the motor 30 to the torque TH of the human driving force H of the human-powered vehicle 10 is also referred to as the ratio Y. In a case where the output of the motor 30 is input to the power transmission path of the human driving force H through the speed reducer, the output of the speed reducer serves as the output of the motor 30.

The controller 52 controls the motor 30 so that the output of the motor 30 is less than or equal to a predetermined value. The output of the motor 30 includes the power WM of the motor 30. The controller 52 controls the motor 30 so that the ratio YA is less than or equal to a predetermined value YA1. In one example, the predetermined value YA1 is 500 watts. In another example, the predetermined value YA1 is 300 watts. The controller 52 controls the motor 30 so that the torque ratio YB is less than or equal to a predetermined torque ratio YB1. In one example, the predetermined torque ratio YB1 is 300%.

In a case where the travel resistance R of the human-powered vehicle 10 is changed, the controller 52 changes the ratio YA of the power WM of the motor 30 to the power WH of the human driving force H and also controls the motor 30 so that a change amount of the travel resistance R differs from a change amount of the power WM of the motor 30. In a case where the travel resistance R is calculated using equation (1), feedback control is performed to control the output of the motor 30 in accordance with the travel resistance R after the human driving force H is increased or decreased by the change in the travel resistance R. In a case where the travel resistance R is calculated using equation (2), feedforward control is performed to control the output of the motor 30 in accordance with the travel resistance R before the human driving force H is increased or decreased by the change in the travel resistance R.

The controller 52 controls the motor 30 so that the ratio X decreases as the travel resistance R increases in a case where the travel resistance R is in a predetermined range dR. The controller 52 controls the motor 30 so that the ratio X decreases in proportion to the travel resistance R in a case where the travel resistance R is in a predetermined range dR. The storage 54 stores the relationship between the travel resistance R and the ratio X. The predetermined range dR is a range greater than or equal to a first travel resistance RX and less than or equal to a second travel resistance RY, which is greater than the first travel resistance RX. The first travel resistance RX can be greater than or equal to zero.

Figure 3:
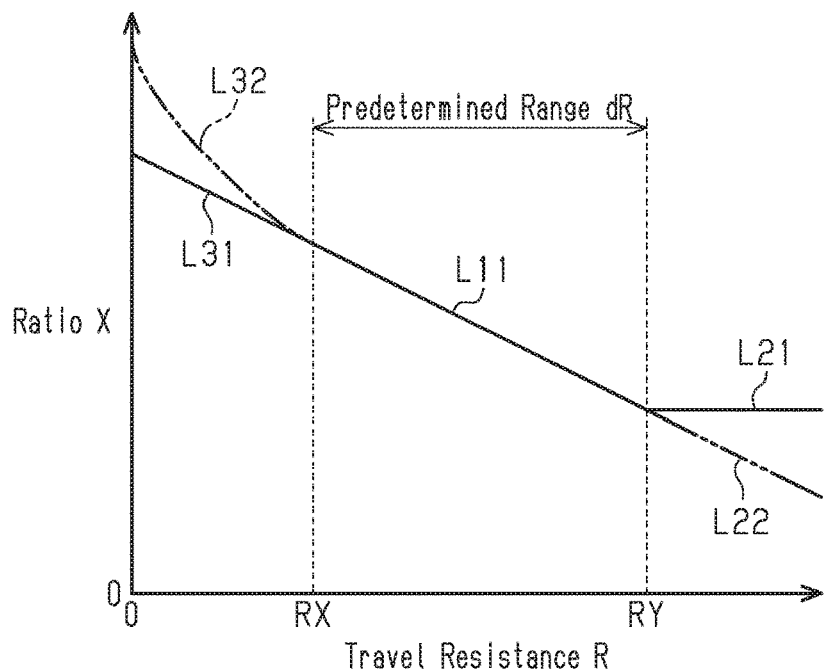
FIG. 3 is a graph showing an example of a relationship between a travel resistance and a ratio stored in a storage of FIG. 2.

FIG. 3 shows an example of the relationship between the travel resistance R and the ratio X stored in the storage 54. As indicated by a solid line L11 in FIG. 3, in a case where the travel resistance R is in the predetermined range dR, the ratio X decreases as the travel resistance R increases. Therefore, the proportion of the human driving force H in the total output of the human-powered vehicle 10 increases as the travel resistance R increases. In a case where the travel resistance R is in the predetermined range dR, the ratio X can be decreased in a stepped manner as the travel resistance R increases. In a case where the travel resistance R is in the predetermined range dR, the ratio X can be decreased in an exponential manner as the travel resistance R increases.

In a case where the travel resistance R is greater than the predetermined range dR, a constant value can be set regardless of the travel resistance R as indicated by a solid line L21 in FIG. 3. In a case where the travel resistance R is greater than the predetermined range dR, the ratio X can be decreased as the travel resistance R increases as indicated by a double-dashed line L22 in FIG. 3.

In a case where the travel resistance R is smaller than the predetermined range dR, the ratio X is preferably decreased as the travel resistance R increases as indicated by a solid line L31 in FIG. 3. In a case where the travel resistance R is smaller than the predetermined range dR, the ratio X can be decreased in an exponential manner as the travel resistance R increases as indicated by a double-dashed line L32 in FIG. 3.

The relationship between the travel resistance R and the ratio X can be different for each of a plurality of control modes. In this case, for example, the inclination of the solid line L11 in FIG. 3 can be different for each control mode. For example, the inclination of the solid line L11 in FIG. 3 can be increased in control modes having larger ratios Y of the output of the motor 30 to the human driving force H. Furthermore, for example, the inclination of the solid line L11 in FIG. 3 can be decreased for control modes having larger ratios Y of the output of the motor 30 to the human driving force H. In at least one of the control modes, the ratio X can be constant regardless of the travel resistance R in a case where the travel resistance R is in the predetermined range dR. In this case, in at least one of the control modes, the controller 52 changes the ratio YA of the power WM of the motor 30 to the power WH of the human driving force H and controls the motor 30 so that a change amount of the travel resistance R differs from a change amount of the power WM of the motor 30 in a case where the travel resistance R of the human-powered vehicle 10 is changed.

The storage 54 can store the relationship between the travel resistance R and the ratio X in a changeable manner. In this case, for example, the controller 52 changes the relationship between the travel resistance R and the ratio X stored in the storage 54 in accordance with the operation of the operation unit P. For example, the controller 52 can be configured to change the relationship so that the inclination of the solid line L11 in FIG. 3 changes in accordance with the operation of the operation unit P. The operation unit P includes an information device and a portable information device that are separate from the human-powered vehicle 10 such as a personal computer, a tablet computer, a cycle computer, and a smartphone. The control device 50 includes an interface unit 51. The interface unit 51 includes at least one of a wired communicator that is connected to an electric cable connected to the operation unit P and a wireless communicator that communicates with the operation unit P through wireless connection. The controller 52, which is electrically connected to the interface unit 51, changes the information stored in the storage 54 in accordance with an input signal from the operation unit P received via the interface unit 51. The operation unit P can be provided in an operating device included in the human-powered vehicle 10. The operating device includes, for example, an operating device for changing the control mode or a cycle computer.

A process for controlling the motor 30 will now be described with reference to FIG. 4. In a case where power is supplied from the battery 28 to the controller 52, the controller 52 starts the process and proceeds to step S11 of the flowchart shown in FIG. 4. As long as the power is supplied, the controller 52 executes the process from step S11 in predetermined cycles.

In step S11, the controller 52 calculates the travel resistance R and then proceeds to step S12. Specifically, the controller calculates the travel resistance R using the output of the first detector 56 and the coefficient and calculation equation stored in the storage 54. In step S12, the controller 52 calculates the output of the motor 30 in accordance with the travel resistance R calculated in step S11 and then proceeds to step S13. Specifically, the controller 52 calculates the output of the motor 30 in accordance with the relationship between the travel resistance R and the ratio X stored in the storage 54.

In step S13, the controller 52 determines whether or not the ratio YA in a case the motor 30 is controlled by the output of the motor 30 calculated in step S12 is less than or equal to the predetermined value YA1 and the torque ratio YB is less than or equal to the predetermined torque ratio YB1. The controller 52 proceeds to step S14 if the ratio YA in a case the motor 30 is controlled by the output of the motor 30 calculated in step S12 is less than or equal to the predetermined value YA1 and the torque ratio YB is less than or equal to the predetermined torque ratio YB1. In step S14, the controller 52 controls the motor 30 to set the output of the motor 30 as calculated in step S12. Then, the controller 52 ends the process.

In at least one of a case where the ratio YA in a case the motor 30 is controlled by the output of the motor 30 calculated in step S12 is greater the predetermined value YA1 and a case where the torque ratio YB is greater than the predetermined torque ratio YB1 in step S13, the controller 52 proceeds to step S15. In step S15, the controller 52 changes the calculated output of the motor 30 so that the ratio YA in a case the motor 30 is controlled by the output of the motor 30 calculated in step S12 is less than or equal to the predetermined value YA1 and the torque ratio YB is less than or equal to the predetermined torque ratio YB1, and proceeds to step S14. In step S14, the controller 52 controls the motor 30 in accordance with the output of the motor 30 calculated in step S15. Then, the controller 52 ends the process.

Modifications

The description related with the above embodiment exemplifies, without any intention to limit, an applicable form of a human-powered vehicle control device according to the present disclosure. In addition to the embodiment described above, the human-powered vehicle control device according to the present disclosure is applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

In a case where the travel resistance R is in the predetermined range dR, the controller 52 can increase the ratio X as the travel resistance R increases. In this case, the proportion of the output of the motor 30 in the total output of the human-powered vehicle 10 increases as the travel resistance R increases. Thus, the human-powered vehicle 10 can easily be moved as the travel resistance R increases.

Figure 4:
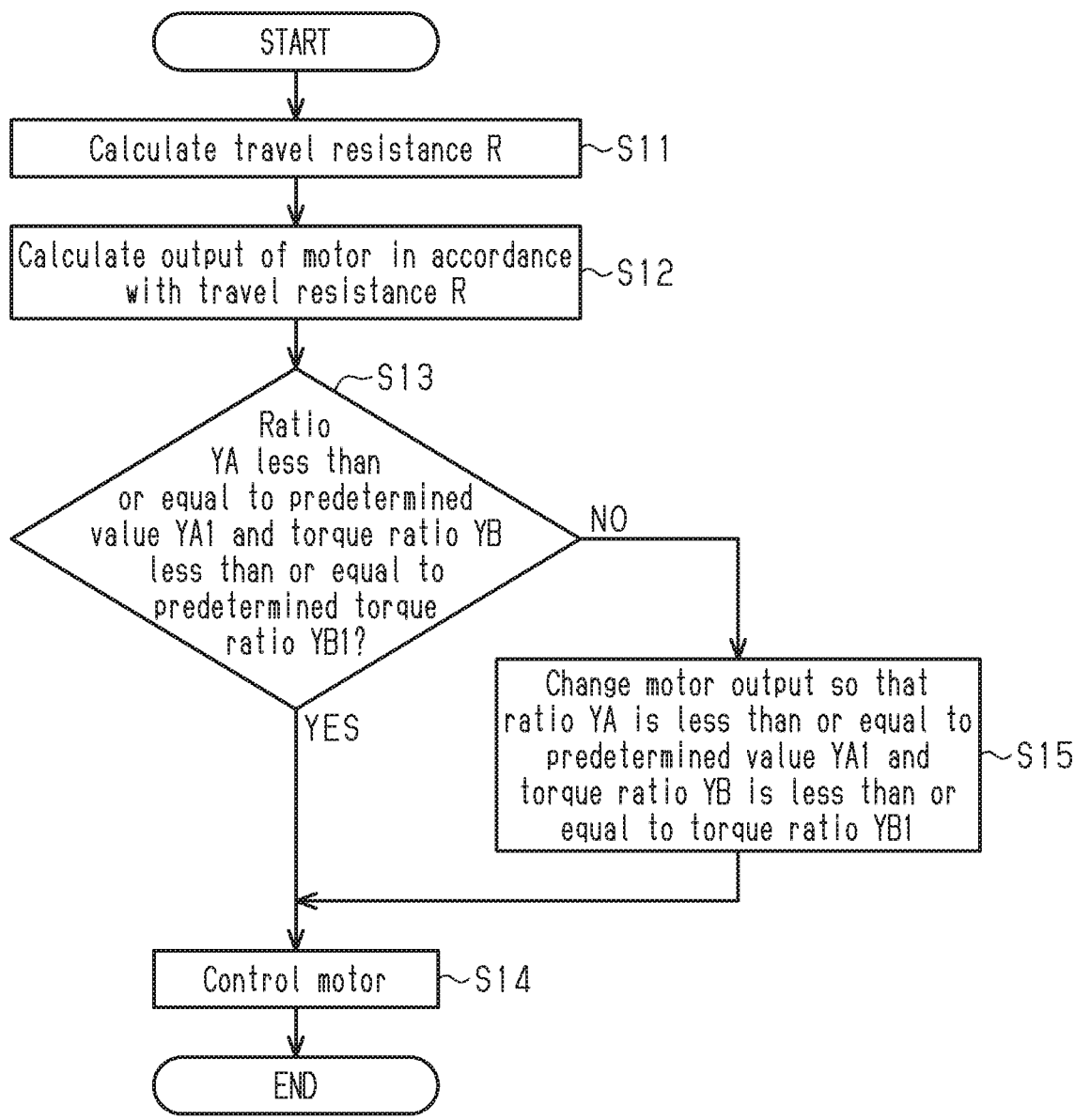
FIG. 4 is a flowchart of a process for controlling the output of a motor executed by an electronic controller of FIG. 2.

Step S13 and step S15 can be omitted from the process for controlling the motor 30 in FIG. 4. Furthermore, the process for determining whether or not the torque ratio YB is less than or equal to the predetermined torque ratio YB1 can be omitted from step S13, and the process for setting the torque ratio YB to less than or equal to the predetermined torque ratio YB1 can be omitted from step S15. Moreover, the process for determining whether or not the ratio YA is less than or equal to the predetermined value YA1 can be omitted from step S13, and the process for setting the ratio YA to less than or equal to the predetermined value YA1 can be omitted from step S15.

The travel resistance R can include only one of the air resistance R1, the rolling resistance R2 of the wheel of the human-powered vehicle 10, and the gradient resistance R3 of the traveling road of the human-powered vehicle 10. Alternatively, the travel resistance R can include only two of the air resistance R1, the rolling resistance R2 of the wheel of the human-powered vehicle 10, and the gradient resistance R3 of the traveling road of the human-powered vehicle 10. This lowers the calculation load on the controller 52 and eliminates the need for a sensor used to calculate the travel resistance R. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
   an electronic controller configured to control a motor that assists in propulsion of a human-powered vehicle in accordance with a human driving force input to the human-powered vehicle,
   the electronic controller being configured to change a ratio of a power of the motor to a power of the human driving force and control the motor in accordance with a change of the power of the human driving force so that a change amount of the travel resistance differs from a change amount of the power of the motor upon determining a travel resistance has changed,
   the electronic controller being further configured to control the motor so that the ratio decreases as the travel resistance increases upon determining the travel resistance is in a predetermined range, the electronic controller being configured to calculate the travel resistance based on an increase or a decrease of the power of the human driving force,
   in a case where the travel resistance is greater than the predetermined range, the electronic controller setting a constant value regardless of the travel resistance so that the ratio can be decreased as the travel resistance increases,
   the predetermined range being a range greater than or equal to a first travel resistance and less than or equal to a second travel resistance that is greater than the first travel resistance, the first travel resistance being greater than or equal to zero,
   the travel resistance including an air resistance, a rolling resistance of a wheel of the human-powered vehicle, a gradient resistance of a traveling road of the human-powered vehicle, and an acceleration resistance of the human-powered vehicle.

2. The human-powered vehicle control device according to claim 1, wherein
   the electronic controller is configured to control the motor so that the ratio decreases in proportion to the travel resistance upon determining the travel resistance is in the predetermined range.

3. The human-powered vehicle control device according to claim 1, further comprising
   a storage having a relationship between the travel resistance and the ratio stored therein.

4. The human-powered vehicle control device according to claim 3, wherein
   the storage stores the relationship between the travel resistance and the ratio in a changeable manner.

5. The human-powered vehicle control device according to claim 4, wherein
   the electronic controller is configured to change the relationship between the travel resistance and the ratio stored in the storage in accordance with an operation of an operation unit.

6. The human-powered vehicle control device according to claim 1, wherein
   the electronic controller is configured to control the motor so that an output of the motor is less than or equal to a predetermined value.

7. The human-powered vehicle control device according to claim 1, wherein
   the electronic controller is configured to control the motor so that a torque ratio of an output torque of the motor to a torque of the human driving force is less than or equal to a predetermined torque ratio.

8. The human-powered vehicle control device according to claim 1, wherein
the electronic controller is configured to control the motor in a plurality of control modes having different ratios of an output of the motor to the human driving force, and
the relationship between the travel resistance and the ratio is different for each of the plurality of control modes.

9. The human-powered vehicle control device according to claim 1, further comprising
a first detector for detecting the travel resistance.

10. The human-powered vehicle control device according to claim 9, wherein
the first detector includes at least one of a sensor for detecting a wind speed, a sensor for detecting a tilt of the human-powered vehicle, a sensor for detecting a vehicle speed of the human-powered vehicle, a sensor for detecting a torque of the human driving force, and a sensor for detecting a rotational speed of a crank of the human-powered vehicle.

11. The human-powered vehicle control device according to claim 10, wherein
the travel resistance is calculated based on the torque of the human driving force, the rotational speed of the crank of the human-powered vehicle, and the vehicle speed of the human-powered vehicle.

12. The human-powered vehicle control device according to claim 1, further comprising
a second detector for detecting the human driving force.

13. The human-powered vehicle control device according to claim 1, wherein
the travel resistance is calculated based on at least a torque of the human driving force, a rotational speed of a crank of the human-powered vehicle, and a vehicle speed of the human-powered vehicle.

14. The human-powered vehicle control device according to claim 13, wherein
the travel resistance is calculated based on at least an output torque of the motor, the rotational speed of the crank, and a power transmission efficiency of the human driving force.

15. The human-powered vehicle control device according to claim 14, wherein
the power transmission efficiency of the human driving force includes a power transmission efficiency of the output torque of the motor to a driving wheel of the human-powered vehicle.

16. The human-powered vehicle control device according to claim 14, wherein
the output torque of the human-powered vehicle is obtained by adding a torque of the human driving force and a torque that is generated by the motor.

17. The human-powered vehicle control device according to claim 14, wherein
the power transmission efficiency is obtained from a loss of a power transmission path of the human-powered vehicle and a transmission ratio that is a ratio of the rotational speed of the crank to a rotational speed of the driving wheel of the human-powered vehicle, the loss of the power transmission path being pre-stored in a storage of the human-powered vehicle.

18. The human-powered vehicle control device according to claim 1, wherein
the travel resistance is calculated based on the sum of the air resistance, the rolling resistance, the gradient resistance, and the acceleration resistance.

19. The human-powered vehicle control device according to claim 18, wherein
the air resistance is obtained from an equation $C \times A \times (V-Va)^2$,
wherein "C" indicates the air resistance coefficient of at least one of the human-powered vehicle and the rider, "A" indicates a front projection area of the human-powered vehicle, "V–Va" indicates a headwind speed of the human-powered vehicle in a forward moving direction.

20. The human-powered vehicle control device according to claim 18, wherein
the rolling resistance is obtained from an equation $M \times m \times g$,
wherein "M" indicates a rolling resistance coefficient of a tire of the human-powered vehicle, "m" indicates a total weight of the human-powered vehicle and a carried load, and "g" indicates a gravitational acceleration of the human-powered vehicle.

21. The human-powered vehicle control device according to claim 18, wherein
the gradient resistance is obtained from an equation $m \times g \times \sin D$,
wherein "m" indicates a total weight of the human-powered vehicle and a carried load, "g" indicates a gravitational acceleration of the human-powered vehicle, an "D" indicates an inclination angle of the road surface on which the human-powered vehicle travels.

22. The human-powered vehicle control device according to claim 18, wherein
the acceleration resistance is obtained from an equation $m \times a$,
wherein "m" indicates a total weight of the human-powered vehicle and a carried load and "a" indicates an acceleration of the human-powered vehicle.

* * * * *